(12) United States Patent
Dirson et al.

(10) Patent No.: US 11,165,852 B2
(45) Date of Patent: Nov. 2, 2021

(54) PROTOCOLS AND METHODS FOR TRANSMITTING A DATA FLOW TRANSITING BETWEEN A HOST COMPUTER AND A REMOTE CLIENT

(71) Applicant: BLADE, Paris (FR)

(72) Inventors: Yann Dirson, Nanterre (FR); Grégory Gelly, Paris (FR)

(73) Assignee: BLADE, Paris (FR)

( * ) Notice: Subject to any disclaimer, the term of this patent is extended or adjusted under 35 U.S.C. 154(b) by 0 days.

(21) Appl. No.: 16/353,840

(22) Filed: Mar. 14, 2019

(65) Prior Publication Data

US 2020/0162540 A1  May 21, 2020

(30) Foreign Application Priority Data

Nov. 16, 2018 (FR) ...................... 1860634

(51) Int. Cl.
   *H04L 29/08* (2006.01)
   *H04L 1/08* (2006.01)
   *H04L 1/16* (2006.01)
   *G06F 9/455* (2018.01)

(52) U.S. Cl.
   CPC ................ *H04L 67/10* (2013.01); *H04L 1/08* (2013.01); *H04L 1/1607* (2013.01); *G06F 9/45533* (2013.01)

(58) Field of Classification Search
   CPC ......... H04L 67/08; H04L 67/10; H04L 67/38; H04L 67/40; H04L 47/22; H04L 47/24; H04L 47/225; H04L 67/32; H04L 47/19; H04L 1/08; H04L 1/089; H04L 1/1607; H04L 1/1858; H04L 69/14; H04L 69/18; H04L 69/165; H04L 49/602; H04L 25/554; H04L 1/16; H04L 1/189; H04L 29/08; H04L 12/801; G06F 15/16; G06F 9/46; G06F 9/452; G06F 9/45533;
   (Continued)

(56) References Cited

U.S. PATENT DOCUMENTS 7,151,754 B1    12/2006 Boyce et al.
8,560,753 B1 *  10/2013 Hobbs ................... G09G 5/363
                                            710/306
(Continued)

FOREIGN PATENT DOCUMENTS

FR            3047576 A1    8/2017

OTHER PUBLICATIONS

French Preliminary Search Report for French Application No. 1860634 dated Mar. 6, 2019, 2 pages.
(Continued)

*Primary Examiner* — James N Fiorillo
(74) *Attorney, Agent, or Firm* — TraskBritt

(57) ABSTRACT

Protocols for transmitting a data flow transiting between a host computer and a remote client use the bandwidth of a computer network. The data includes at least display and sound data generated by a user session running on the host computer, and control data generated by at least one remote system I/O device. The transmission protocol includes a plurality of data flow reliability treatments to address transmission failures, the reliability treatments applying to the display, sound and control data respectively being different from each other.

4 Claims, 4 Drawing Sheets

(58) Field of Classification Search
CPC ..... G06F 3/1454; G06F 9/455; H04R 25/554; A63F 13/00; A63F 13/71; A63F 13/358
USPC ...... 709/204.217, 230, 204, 217.23; 714/752
See application file for complete search history.

(56) References Cited

U.S. PATENT DOCUMENTS

| | | | |
|---|---|---|---|
| 2006/0020665 A1* | 1/2006 | Hagale | H04L 29/06027 709/204 |
| 2007/0038701 A1* | 2/2007 | Majors | H04L 29/06027 709/204 |
| 2008/0181260 A1* | 7/2008 | Vonog | H04N 7/15 370/519 |
| 2010/0074200 A1* | 3/2010 | Li | H04L 1/1887 370/329 |
| 2011/0078532 A1* | 3/2011 | Vonog | H03M 13/3761 714/752 |
| 2011/0255451 A1* | 10/2011 | Moon | H04L 5/1469 370/280 |
| 2014/0056451 A1* | 2/2014 | El-Hoiydi | G10L 19/005 381/315 |
| 2014/0146677 A1* | 5/2014 | Howes | H04L 47/6215 370/235 |
| 2015/0046599 A1* | 2/2015 | Ulanov | H04L 67/38 709/230 |
| 2016/0216993 A1* | 7/2016 | Beckwith | H04L 67/08 |
| 2017/0026439 A1* | 1/2017 | Verma | H04N 21/4343 |
| 2017/0228851 A1 | 8/2017 | Freund et al. | |
| 2017/0324628 A1* | 11/2017 | Dhanabalan | H04L 47/24 |
| 2018/0212886 A1* | 7/2018 | Contavalli | H04L 47/225 |

OTHER PUBLICATIONS

European Extended Search Report and Opinion for European Application No. 19208667, dated Jan. 13, 2020, 8 pages.

* cited by examiner

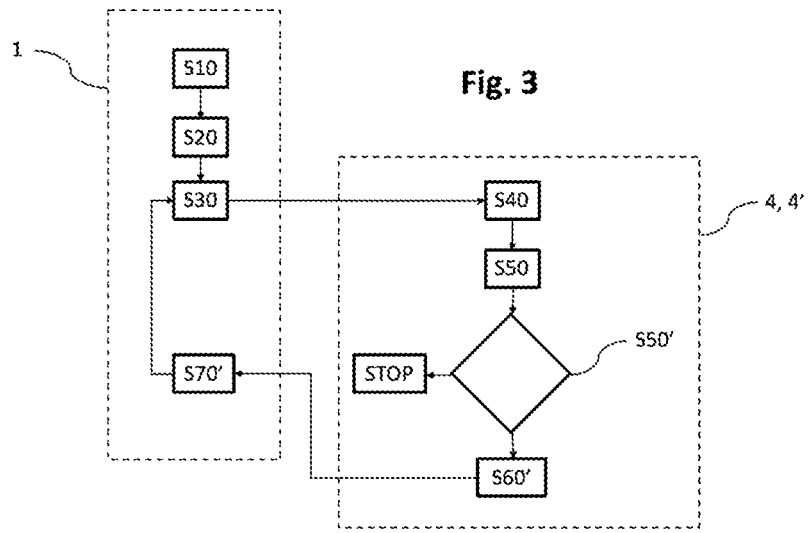
Fig. 3
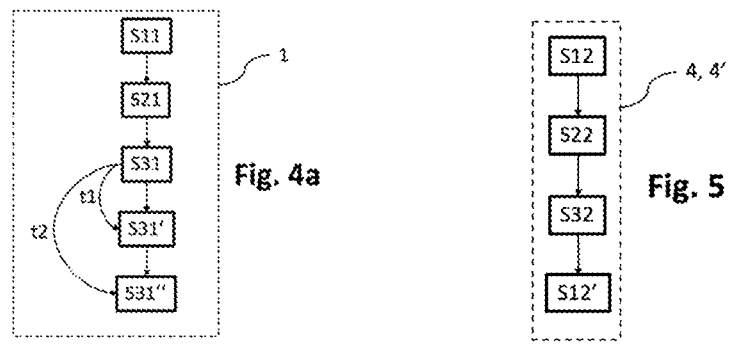
Fig. 4a
Fig. 5
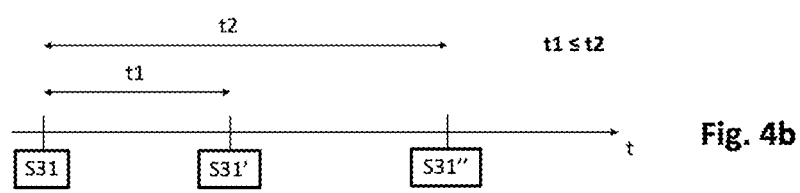
Fig. 4b

PROTOCOLS AND METHODS FOR TRANSMITTING A DATA FLOW TRANSITING BETWEEN A HOST COMPUTER AND A REMOTE CLIENT

PRIORITY CLAIM

Pursuant to 35 U.S.C. § 119(a), this application claims the benefit of the filing date of French Patent Application Serial No. 1860634, filed Nov. 16, 2018, for "PROTOCOL FOR TRANSMITTING A DATA FLOW TRANSITING BETWEEN A HOST COMPUTER AND A REMOTE CLIENT," the disclosure of which is incorporated herein in its entirety by this reference.

TECHNICAL FIELD

The present invention relates to a protocol for transmitting a data flow transiting between a host computer and a remote client using the bandwidth of a computer network.

BACKGROUND

Documents US2017228851 and FR3047576 describe a computer system configuration, wherein user interface devices (display, keyboard, E) are separated from the processing part of the application. User interface devices (also collectively referred to as the "client") are located near the user while the processing and storage components that form a host computer are located in a remote hosting location. User interface devices generally have access, at the host computer, to a dedicated virtual machine via a network (usually the Internet), with the virtual machine emulating the processing, storage and all other computing resources required for the user to operate a computer session, as if it was running locally. The host computer hosts the operation system and software applications used by the clients, which limits the processing resources on the client side.

It is common for the host computer to consist of a plurality of physical computer systems (servers), each hosting a plurality of virtual machines. Each virtual machine is connected to a client, and provides a dedicated virtual environment to emulate the functions of a physical personal computer, including processing graphical data, and provide user session display information on the client's screen. The data to be displayed, called display data, is transferred to the client, as well as the sound data. The client has sufficient IT resources to receive the data flow and to display and/or transmit it. The client also exchanges information or instructions with the virtual machine, such as those generated by interface devices (keyboard, mouse, etc.). This information is called control data.

All this information, which includes display data, sound data and control data, forms a data flow that is transmitted between the host computer and the client over the network.

There are a wide variety of standard telecommunications protocols for transmitting a data flow between a host computer and a client. For example, the user datagram protocol, also called UDP, which is a non connection-oriented protocol, which allows data transmission in a simple and fast way. However, the lack of connection and prior communication between the host computer and the client, which allows for rapid transmission, results in the absence of error control. The UDP protocol does not guarantee that the transmitted data will not be lost or duplicated. In other words, this protocol ensures rapid delivery of data but presents a risk that the data may be lost or arrive in a disorderly manner.

As a complementary example, the transmission control protocol, called TCP, is also known. This protocol is a transport protocol in connected mode that is reliable, i.e., without risk of data loss. The reliability mechanisms implemented by this protocol include, for example, sequencing data packets, transmitting information from the receiver to the sender as to the space still available in its memory, an acknowledgement mechanism, etc. However, these mechanisms have the disadvantage of slowing down communication. In other words, this protocol ensures a reliable transmission, without loss and in the order of data, but induces significant latency.

Alternative transport layer protocols to UDP and TCP protocols have been provided for the transmission of an audiovisual data flow. Thus, the real-time transmission protocol, called RTP, is a protocol optimized for the transfer of dynamic data over a point-to-point network respecting real-time constraints. Using the UDP protocol, the RTP protocol also provides mechanisms for detecting packet loss. However, it does not always manage resources in the network, which can lead to network congestion and increased latency.

There are situations where it is necessary to have a low-latency and reliable data flow communication between the host computer and the remote client. This is particularly the case for video games, where the user cannot afford to experience significant latency or data loss.

In these situations, the known protocols appear unsatisfactory in view of their respective weaknesses.

The subject matter of this disclosure aims to solve this problem, and provides a protocol that is particularly suitable for transmitting display, sound and control data between a host computer and a remote client.

BRIEF DESCRIPTION

In order to achieve this goal, the subject matter of this disclosure provides for a protocol for transmitting a data flow between a host computer and a remote client using the bandwidth of a computer network, the data including at least:

display and sound data generated by a user session running on the host computer, and
  control data generated by at least one input-output device of the remote system,
  the transmission protocol comprising a plurality of data flow reliability treatments to prevent transmission failures, with the reliability treatments applying respectively to the display, sound and control data being different from each other.

By specifically processing display, sound and control data, the data flow transmission protocol makes it possible to take into account the specific characteristics of each type of data to make the transmission of the data flow between the host computer and the client more reliable, without excessively deteriorating the quality of the transmission, and in particular its latency.

According to other advantageous and unrestrictive characteristics of the invention, taken alone or in any technically feasible combination:

the data is sequenced into packets of display data, sound data and control data;
  the packets are numbered;
  the display data reliability treatment includes the following steps:
    the detection, by the remote client, of a loss of display data;

in case of a detection of a loss of display data, the transmission, by the remote client to the host computer, of a negative acknowledgement information message reporting the loss of display data;

if the negative acknowledgement information message is received, the transmission of the lost display data from the host computer to the remote client;

the display data reliability treatment includes the following steps:

the detection, by the remote client, of a loss of display data;

in the absence of detection of a loss of display data, the transmission, by the remote client to the host computer, of an acknowledgement information message reporting the absence of loss of display data;

if the acknowledgement information message is not received, the transmission of the lost display data from the host computer to the remote client;

the sound data reliability treatment includes a step of external redundancy for the transmission of the packets of sound data;

the step of external redundancy includes the following steps:

a first transmission of a first packet of sound data;

a second transmission of the first packet of sound data, the second transmission taking place after a first period of time;

a first transmission of a second packet of sound data, with the first transmission of the second packet of sound data occurring after a second period of time;

the first period of time being less than the second period of time, the second packet being numbered by the integer directly greater than the number of the first packet;

the first period of time is between 5 and 20 ms, and the second period of time is between 10 and 30 ms;

the control data treatment includes a step of internal redundancy for the transmission of the packets of control data;

the step of internal redundancy includes the following steps:

preparing a first sequence of control data into a first packet of control data;

transmitting the first packet of control data;

preparing a second sequence of control data into a second packet of control data, the second sequence of control data comprising at least a part of the first sequence of control data;

transmitting the second packet of control data.

BRIEF DESCRIPTION OF THE DRAWINGS

Other characteristics and advantages of the subject matter of this disclosure will emerge from the detailed description of the invention that follows with reference to the appended figures on which:

FIG. 3 represents the successive steps of a second embodiment of a display data treatment according to this disclosure;

FIG. 4a represents the successive steps of one embodiment of a sound data treatment according to this disclosure;

FIG. 4b represents a graph showing the chronology of the successive steps of one embodiment of a sound data flow treatment according to this disclosure;

FIG. 5 represents the successive steps of one embodiment of a control data flow treatment according to this disclosure;

DETAILED DESCRIPTION

In the following description, detailed descriptions of known functions and elements, which could unnecessarily make the essential elements of this disclosure obscure, will be omitted.

IT Architecture

Figure 1:
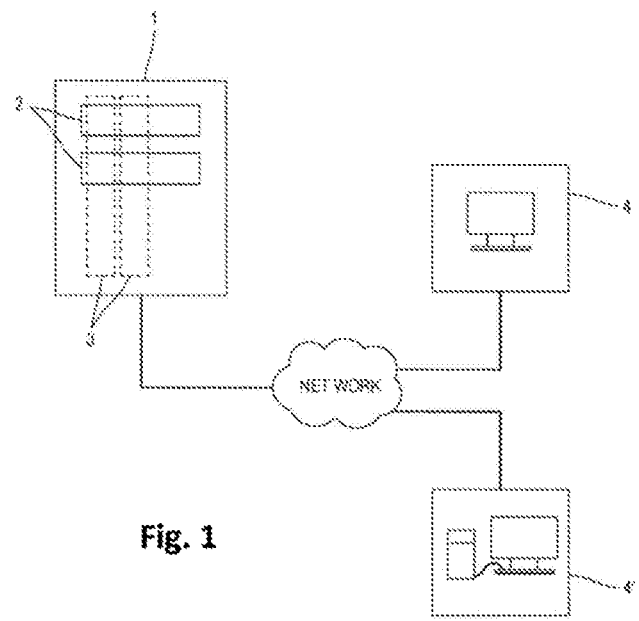
FIG. 1 represents a computer architecture wherein embodiments of the present disclosure can be implemented.

FIG. 1 represents an IT architecture for implementing the data flow transmission protocol of this description.

This architecture is formed here by a host computer 1 that has a plurality of servers 2. The servers 2 are made up of high-performance components (CPU, memory, storage disk, graphics and network cards, etc.) in order to form a particularly efficient hardware platform for running applications that may require significant processing capacities, such as video games.

As is well known, the servers 2 can be configured to host one or more virtual machine(s) 3, along with their operation system and applications. Virtualization enables a plurality of virtual machines 3 to be hosted in each server 2 to provide a plurality of virtual environments totally isolated from each other. Each virtual environment has access to the server's hardware resources (CPU, memory, storage media, graphics card, etc.) to run a user computer session. Well-known virtualization technologies include Citrix XenServer, Microsoft Hyper-V, VMware ESXi, Oracle Virtual box, Quick Emulator under the GNU Open License (QEMU), etc.

Each of the virtual machines 3 in the host computer 1 can be dedicated to a specific user. The users interact with their dedicated virtual machines 3 from remote clients 4, 4', each one being connected to the host computer 1 via a network such as the Internet. Since most, if not all, of the processing is done at the host computer 1, the remote clients 4, 4' can remain very simple, and may include, for example, a simple terminal, a network connector and basic I/O devices (keyboard, mouse . . . ) as represented by the remote client 4 in FIG. 1. The remote client 4 can be a simplified computer device, such as a tablet, a smartphone. Alternatively, it may be a standard personal computer, with its own CPU, graphics card, peripherals, . . . as represented by the remote client 4'.

Each server 2 of the host computer 1 preferably hosts less than ten virtual machines 3 to provide sufficient IT resources, including hardware, to each virtual machine 3 to run high-performance applications with a sufficient level of service. Each virtual machine 3 is created at the time the client connects to the host computer 1 and includes a virtual central processing unit, a virtual main memory, a virtual or physical graphics card and other resources. Preferably, a high-performance physical graphics card is associated with each virtual machine 3. This graphics card comprises at least one graphics processing unit for preparing session display data, and an encoder capable of forming a video stream, for example, in H.264 format, from the display data developed by the computer session.

Each virtual machine 3 emulates a high-performance virtual personal computer that is associated and controlled by a remote client 4, 4'. Each virtual machine 3 is therefore a user session, or is the equivalent thereof, and many of these user sessions can be run on the servers 2 of the host computer 1. The computing architecture can include a plurality of interconnected host computers 1, which may be located in geographically separate data centers.

A virtual machine and the associated client communicate to each other a flow of display and sound data, produced by the user session on the host computer 1, and control data, produced by the interface devices of the remote client 4, 4'.

A program for capturing and broadcasting session information runs in the background in the virtual machine user session 3. The capture and broadcast program implements operations to collect raw display, sound and control data prepared by the computer session, to encode this data to limit the use of network bandwidth and to transmit it to the remote client 4, 4', via a network controller. The capture and broadcast program can control the level of encoding (i.e., compression) of the raw display or sound data. The capture and broadcast program also receives and decodes the control data communicated by the remote client 4, 4', and provides it to the user session for processing and exploitation.

The remote client 4, 4', is equipped with sufficient hardware resources to run an operation program to decode the information provided by the host computer 1, including displaying the display data and reproducing the sound data. The operation program also prepares and transmits the control data generated by the interface devices of the remote client 4, 4' to the host computer 1.

Protocol

It is common to describe the communication functions between two computer systems by referring to the OSI conceptual model (acronym for "Open System Interconnection"). The upcoming description aims to define the transport protocol, forming the layers of this model, to address some of the transmission failures that may occur between the host computer 1 and the remote client 4, 4'. The treatment using the functionalities of the other layers of the OSI model, in particular those of the application layer, the presentation layer and the session layer, can be performed using standard protocols, which are well known per se, and will therefore not be described in greater details for the sake of brevity.

In particular, the protocol as described here governs the logical communication between the capture and broadcast program and the operation program running on the host computer 1 and the remote client 4, 4' respectively. The data flow flows between the input and output ports associated with these programs. The capture and broadcast program and the operation program may also be referred to later in this description as "sending program" or "receiving program," depending on the operations they perform.

Different types of transmission failures can occur when the data flow between the host computer 1 and the remote client 4, 4' are in transit. Data loss refers to the situation where a data packet from the output port does not reach the input port before a predetermined time has elapsed. Packet desequencing refers to the fact that a set of packets transmitted from an output port of the sending program following a particular sequence reaches the input port of the receiving program in a different order. Unintentional duplication of data packets refers to the situation where a data packet, transmitted from the input port to the output port, is received several times at the input port.

A transmission method (also referred to as a "transmission protocol") in accordance with this description includes a plurality of data flow reliability treatments to prevent possible transmission failures.

In general, reliability treatments implement mechanisms aiming at making the information transmitted redundant in order to make sure that it is received correctly. This redundancy of information, which may include a simple ordered numbering of the transmitted data packets or the duplication of data packet transmission, results in an increase in the bandwidth consumed during the transit over the computer network. Excessive consumption of this bandwidth results in network congestion, which is likely to result in increased latency, increased jitter, i.e., a variation in latency over time, and an increase in the rate of packet loss. It should be reminded that latency refers, for the purposes of this description, to the period of time between the time when the data (display, sound and/or control data) to be transmitted is made available by the host computer and/or the client, and the time when this data is used (displayed or reproduced by the remote client 4, 4' in the case of display and sound data, processed by the host 1 in the case of control data).

In the IT environment described above, particular attention is paid to limiting this latency, so that the user of a remote client 4, 4' has the impression that he or she has local access to the IT resources made available by the host computer 1. It is therefore particularly important for the data flow reliability treatment to be designed as accurately as possible, in order not to cause an excessive bandwidth consumption.

The Applicant found that the display, sound and control data has very different characteristics of its own. Display data is characterized by a high volume compared to other data. Display data is generally the main contributor to the flow of data over the computer network. Sound and control data has a much smaller data volume than display data. This is particularly true for control data. On the other hand, it is important that these control data can be transmitted at a high frequency, much higher than that of other data, so as not to delay the processing of such data by the host computer 1. Frequency here refers to the number of data packets addressed on the network per time unit. For example, the transmission frequency of control data can reach about 1,000 Hz, while the transmission frequency of sound data can be from 25 to 100 Hz.

To avoid transmission failures, without unduly affecting latency, the reliability treatments implemented by the transmission protocol that apply to the display data, sound data and control data respectively are all different from each other.

Applying a different treatment to each type of data thus makes it possible to take into account the difference in the characteristics of each of the data, and to limit the consumption of bandwidth during the secured transmission of the data flow.

Generally speaking, the transmission protocol includes a step of encapsulating the display, sound or control data, i.e., gathering this data into data units called packets. The encapsulation step is implemented by the sending program. The encapsulation step also includes the addition of a header, which indicates the port of the sending program, called the output port, the port of the receiving program, called the input port. The header also indicates the total length of the packet running between the host computer 1 and the remote client 4, 4'. The header can also provide for an error check on the packet content, for example, by means of a checksum calculation.

For example, the identification of the output port and the identification of the input port can be encoded on 16 bits each, or 2 bytes. Similarly, the total packet length and error control field can be encoded on 16 bits each. However, this disclosure is by no means limited to these particular characteristics.

These data packets are then themselves encapsulated in a network layer packet, the layer of the OSI model, including the source logical address and the destination logical address, to enable the packet to be routed through the network. In the case of transit via the Internet, the logical addresses are the IP addresses of the host computer 1 and the remote client 4, 4'.

According to a particularly advantageous embodiment of this disclosure, the data flow transmission protocol includes a step wherein the packets are numbered by the sending program. Such numbering is particularly advantageous to ensure greater reliability in the transmission of the data flow, since it makes it possible to identify a specific packet more reliably and to know its transmission chronological order relative to the other packets. In other words, the packet number is used to determine where in the data flow the packet in question should be located in relation to the other packets received. It enables the receiving program to reorder the received packets before using them. The packet number is then provided in the header.

The packet number field can be encoded on 8 bits in the packet header, for example, i.e., 1 byte. However, this disclosure is by no means limited to such a characteristic.

Treatment of the Display Data Flow Reliability

Figure 2:
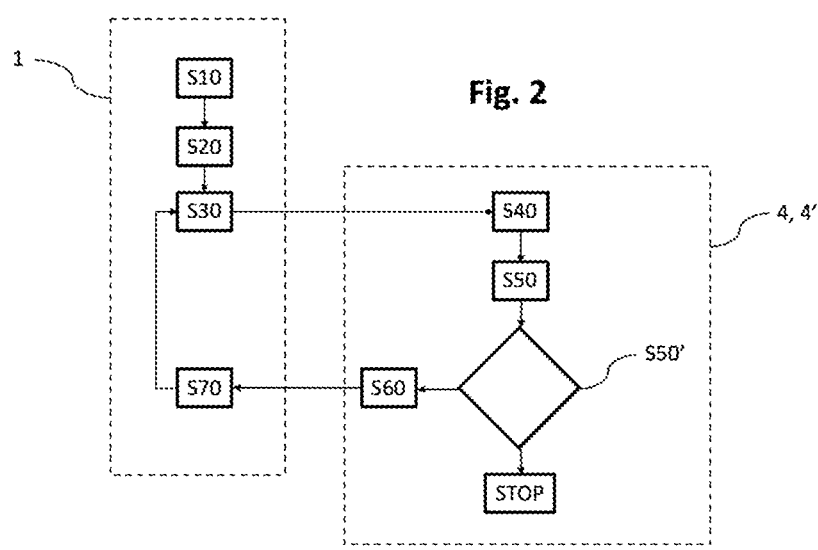
FIG. 2 represents the successive steps of a first embodiment of a display data treatment according to this disclosure.

FIG. 2 shows an example of a reliability treatment applied to the transmission protocol display data. This treatment is carried out jointly by the capture and distribution program running on the host computer 1 and by the operation program running at the remote client 4, 4'.

The reliability treatment includes a step S10 of encapsulating the display data. The display data can take the form of a compressed video stream, for example, in H.264 format, prepared by an encoder from the screen images of the computer session running in the virtual machine 3 of the host computer 1.

The reliability treatment shown in FIG. 2 then involves a step S20 of numbering the packets of display data before they are sent to the remote client.

In a step S30, the packets of display data are sent by the host computer 1 to the output port specified in the header specific to the transport layer of the packet of display data. The output port is associated with the capture and distribution program running in the background in the computer session.

As already mentioned, the routing of the packets of display data from the output port of the host computer 1 to the input port associated with the remote client 4, 4' operation program is done over the network using network layer protocols such as IP protocols.

In a step S40, the packets of display data are received by the remote client 4, 4' at his/her input port, also indicated in the header specific to the transport layer of the packet of display data.

After the remote client 4, 4', and more particularly the operation program running on this client, has received the display data flow, the received display data flow is decoded and processed to be displayed on a screen of the remote client 4, 4'.

The reliability processing includes a step S50 of detecting the loss of the display data by the remote client 4, 4'. This step is implemented by the operation program. Such detection is made possible by the packet numbering. Indeed, this numbering enables the remote client 4, 4' to recognize a particular packet and to be able to identify, according to the numbers of the received packets, a missing number.

According to a first approach, the operation program detects the loss of display data if a received packet does not have the packet number corresponding to the integer directly higher than the number of the last received packet.

In another approach, the operation program detects the loss of display data after a predetermined waiting time between the receipt of a numbered packet and the receipt of the next numbered packet has elapsed.

Regardless of the detection mode used, this step of detecting display data loss is accompanied by a test step S50', during which the operation program performs a binary test depending on whether it has detected a data loss or not. If no loss of display data is detected, the reliability treatment ends (STOP).

If the remote client 4, 4' detects a loss of display data, a step S60 implemented by the operation program provides for the remote client 4, 4' to transmit a negative acknowledgement information message to the host computer 1 indicating the loss of display data. The negative acknowledgement information message transits, in the same way as the display data flow, between the output port and the input port dedicated thereto.

To do this, the negative acknowledgement message indicates in particular the output port (which may be the same as the input port of the packet of display data or not), the input port (which may be the same as the output port of the packet of display data or not), its nature as a negative acknowledgement message, as well as the number of the corresponding packet of display data.

If a negative acknowledgement information message is received by the host computer 1, a step S70 provides that the capture and broadcast program will find the packet containing the lost display data. To enable this functionality, the reliability treatment includes a prior step of storing packets of display data. For example, this storage step may consist in preserving the last 256 packets of display data in the memory of the host computer 1.

After this step, the capture and broadcast program returns to step S30 to send the packet of display data again.

According to an alternative solution of the protocol shown in FIG. 3, if the binary test performed in step S50' characterizes the detection of a loss of display data, the reliability treatment ends (STOP).

If the remote client 4, 4' does not detect a loss of display data, i.e., if it correctly receives the packet of display data, a step S60' provides for the remote client 4, 4' to transmit an acknowledgement information message to the host computer 1 indicating that no display data has been lost, and therefore that the packet has been received correctly.

The acknowledgement information message transits, in the same way as the display data flow, between the output port and the input port dedicated thereto.

To do this, the acknowledgement message indicates in particular the output port (which may be the same as the input port of the packet of display data or not), the input port (which may be the same as the output port of the packet of display data or not), its nature as an acknowledgement message, as well as the number of the corresponding packet of display data.

According to this alternative solution, and in the event that the host computer 1 does not receive an acknowledgement information message within a predetermined time, a step S70' provides that the capture and broadcast program of the host computer 1 will recover the lost data packet, following the same mechanism as the one described in step S70.

After this step, the capture and broadcast program returns to step S30 to send the packet of display data again.

This alternative solution has the advantage of enabling the host computer 1 to have the assurance that a packet has reached the remote client 4, 4' as soon as it has been acknowledged by the latter. It makes the transmission of the packets of display data very reliable, at the cost of a higher acknowledgement data rate, which can have an effect on the quality of the transmission.

The transmission of the acknowledgement or the negative acknowledgement information messages can be done according to the same channel as the so-called "video" channel which enables the transmission of the display data flow. In this case, the video channel is a so-called "duplex" communication channel. The video channel can be alternately a so-called "full-duplex" channel, i.e., the data can be transported simultaneously in both directions, or "half-duplex" channel, i.e., the remote client 4, 4' and the host computer 1 cannot simultaneously transmit a data flow.

Information other than the display data itself and the acknowledgement data can be exchanged between the host computer 1 and the remote client 4, 4'. This additional data can be used to determine the bandwidth of the computer network between the host 1 and the remote client 4, 4', or a measure of the transmission latency. For example, placing packet time stamp information in the headers, thus enabling the client, after synchronizing with the host computer, to determine the average latency of reception of the display data and communicate it to the host computer can be considered. This data can be used to adjust, through the capture and broadcast program, the level of compression used when encoding screen images to form the display data.

Reliability Treatment of the Sound Data

The reliability treatment of the data flow provides for a separate treatment of the sound data. This separate reliability treatment may correspond to the external redundancy of the transmission of the packets of audio data.

External redundancy refers to the duplication of the packets of audio data transmitted from the host computer 1 to the remote client 4, 4'. This means that the same packet of audio data is systematically transmitted several times from the host computer 1 to the remote client 4, 4'. Thus, if such a data packet is lost during the transmission, the duplicate packets enable the sound data contained in these packets to still have a possibility to reach the remote client 4, 4'.

Thanks to the numbering of the packets of sound data, the remote client 4, 4' also has the possibility to detect the packets of packets of sound data already received and to process only one of them, which does not increase the computing power required by the remote client 4, 4'.

This sound data reliability treatment is advantageous in that it reduces the risk of losing a packet of sound data without excessively overloading the bandwidth, as the size of a packet of sound data is often small or even negligible, especially compared to the size of a packet of display data.

According to a particularly advantageous embodiment shown in FIG. 4*a*, the treatment of the sound data comprises an encapsulation step S11. The sound data can take the form of a compressed audio stream prepared by an encoder. The encoder compression can be performed in known formats, such as MP3, Windows Media Audio or WMA Lossless for example. The sound data is prepared by the capture and broadcast program running in the background in the user session. These can be sound sections made available by the operation system of the virtual machine 3, for example, 10 ms sections.

The treatment then includes a step S21 to number the packets of sound data.

The steps S11 and S21 of encapsulating and numbering packets of sound data can be repeated for each packet of sound data before each transmission of the packet.

Then, in a step S31, a first packet of sound data, numbered N, is transmitted during a first transmission.

This transmission is carried out, in the same way as for the display data, at the output port of the host computer, indicated in the header specific to the transport layer of the packet of sound data. The routing from the output port of the host computer 1 to the input port of the remote client 4, 4' is done via the network using network layer protocols such as IP protocols.

During a step S31', the packet N is transmitted again according to the same procedure as the first transmission, this second transmission of the packet N taking place after a first period of time, noted t1.

In a step S31", a second packet of sound data, which corresponds to the packet directly following the first packet N, is transmitted in turn using the same method. This second packet is thus numbered N+1. This transmission of the packet N+1 occurs at the end of a second period of time after the first transmission of the packet N, with the period of time t2. This period of time t2 is naturally chosen smaller than or equal to the duration of the sound section after the packet has been decoded and reproduced on the client's side. This ensures that the sound produced by the computer session on the host computer side 1 can be continuously reproduced on the client side 4, 4'.

Figure 6A:
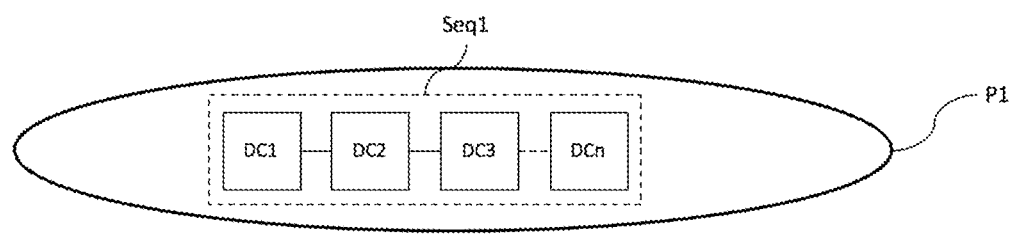
FIG. 6a shows the diagram of a first packet of control data according to this disclosure.
Figure 6B:
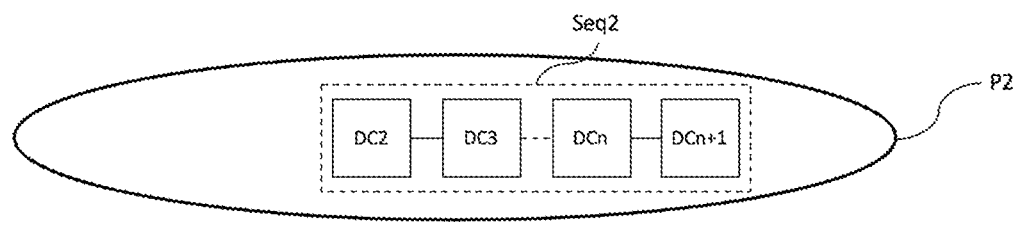
FIG. 6b shows the diagram of a second packet of control data according to this disclosure.

The transmission times between a packet N and its duplicate, noted t1, and between a packet N and the next packet N+1, noted t2, are such that the first period of time is preferably chosen lower than the second period of time, t1<t2, as shown in FIG. 6*b*. In other words, interleaving the first and second sound packets is avoided, as such interleaving may, in the event of loss of the first packet of audio data, degrade the quality of the sound reproduced for the user.

According to a particular embodiment, the first period of time t1 is between 5 and 20 ms, and the second period of time t2 is between 10 and 30 ms.

Treatment of the Control Data Flow

The data flow reliability treatment provides for a separate treatment of the control data. This separate reliability treatment may correspond to the internal redundancy of the transmission of packets of control data.

A "sequence of control data" refers to a specific number of control data provided successively by the various interface devices of the remote client 4, 4'. This may include the latest data provided by the keyboard and the mouse, corresponding to the keys pressed on the keyboard, the mouse movement, etc. The control data generated by the interface devices are captured by the operation program running at the remote client 4, 4', and put into sequences, incorporating, for example, the last 10 or 20 control data captured.

"Internal redundancy" refers to the integration of a sequence of control data into the same packet of control data. A new packet of control data is prepared by the operation program for the capture of each new control data, which therefore includes this new control data and a predetermined number of preceding control data, and is already transmitted in a previous packet of control data.

According to the particular embodiment shown in FIG. 5, the reliability treatment of the control data thus includes a step S12 of encapsulating a first sequence of control data into a first packet P1 of control data.

The treatment can then include a step S22 of numbering the packet of control data at the remote client 4, 4', according to the means mentioned above.

Then, the treatment provides for a step S32 of transmitting the first packet P1 of control data from the remote client 4, 4' to the host computer 1.

The treatment also includes, after the operation program receives a new control data, a step S12' of encapsulating a new sequence of control data into a second packet P2 of control data. The encapsulation is done according to the same procedures as in step S12. In step S12', the new sequence of control data consists of the captured new control data and part of the first data sequence transmitted in the first packet P1. The second packet P2 is then in turn transmitted from the remote client 4, 4' to the host computer 1 during a step S32' of transmission.

FIG. 6a schematically illustrates a first packet P1 of control data according to the step S12. This data packet P1 contains a first sequence Seq1 of control data. In the particular example of FIG. 6a, the first sequence Seq1 includes n control data referenced from DC1 to DCn.

FIG. 6b schematically illustrates a second packet P2 of control data according to the step S12'. In the example given in FIG. 6b, the second packet P2 comprises a second sequence Seq2 of control data. This new data sequence contains the new control data DCn+1 as well as a part of the first data sequence Seq2 transmitted in the first packet P1. In this particular example, the second sequence Seq2 contains all the control data of the sequence Seq1 with the exception of the first control data DC1.

This advantageous configuration makes it possible for the memory of the control data already transmitted to be retained without changing the size of a packet of control data.

On the host computer 1 side, the capture program receives the packets of control data, processes the received packets to retrieve therefrom the control data sequences. It decodes these sequences to reconstruct the sequence of the control data captured on the client's side, by reconstructing the complete sequence even though one or more packet(s) is/are not received.

The control data must be able to be transmitted at a much higher frequency than the sound and display data in order to be processed immediately by the host computer 1 and to ensure a satisfactory level of service for the user. The transmission of the control data can reach a frequency of 1,000 Hz, compared to a typical frequency of 25 to 100 Hz for the sound and display data. The internal redundancy mechanism therefore makes it possible to address each new control data to the host computer 1 without undue delay, and to make the control data redundant on the host computer 1 side without increasing the frequency of sending the data packets, as would be the case with an external redundancy mechanism. Sending even small packets at a high frequency can lead to network congestion and reduce the quality of the transmission.

By specifically treating the display, sound and control data, the flow transmission protocol just presented makes it possible, by taking into account the characteristics specific to each type of data, to make the transmission of the data flow between the host computer 1 and the remote client 4, 4' more reliable, without excessively deteriorating the quality of the transmission, and in particular the latency thereof.

Of course, this disclosure is not limited to the embodiment described and alternative embodiments can be provided within the scope of this disclosure, including specific embodiments as defined by the claims.

Thus, the data can be transmitted through a single input/output port of the host computer 1 and the remote client 4, 4', enabling the transmission, through the same port, of the data flow including the display data, the sound data and the control data.

Alternatively, the data can be transmitted through separate ports for each type of display, sound and control data. In this case, the data flow is transmitted over three separate channels between the host computer 1 and the client 4, 4'.

The protocol may provide that some steps will not be performed by the capture and broadcast program running in the background in the computer session. In particular, the steps S10, S11 of data encapsulation, the steps S20, S21 of numbering the data packets, S30, S31, S31', S31" of sending the data packets and/or the step S70 of retrieving the packets of display data can be performed by a program external to the virtual machine whereon the computer session is running. Similarly, the step of receiving and/or processing the packets of control data can be performed by a program external to the virtual machine.

For example, the capture and broadcast program can only consist in controlling the encoding and/or decoding of the data and providing/receiving the encoded data to a program outside the virtual machine, responsible for implementing the reliability and transmission-reception processing of the data packets. In this situation, the computational load imposed on the virtual machine whereon the computer session is running is advantageously minimized.

The protocol may provide for the transmission of data other than display, sound and control data between the host computer and the client. This data can be transmitted using an existing channel or a dedicated channel. In particular, for data consisting of small frames, a processing similar to the one described for sound data or control data may advantageously be considered.

Figure 7:
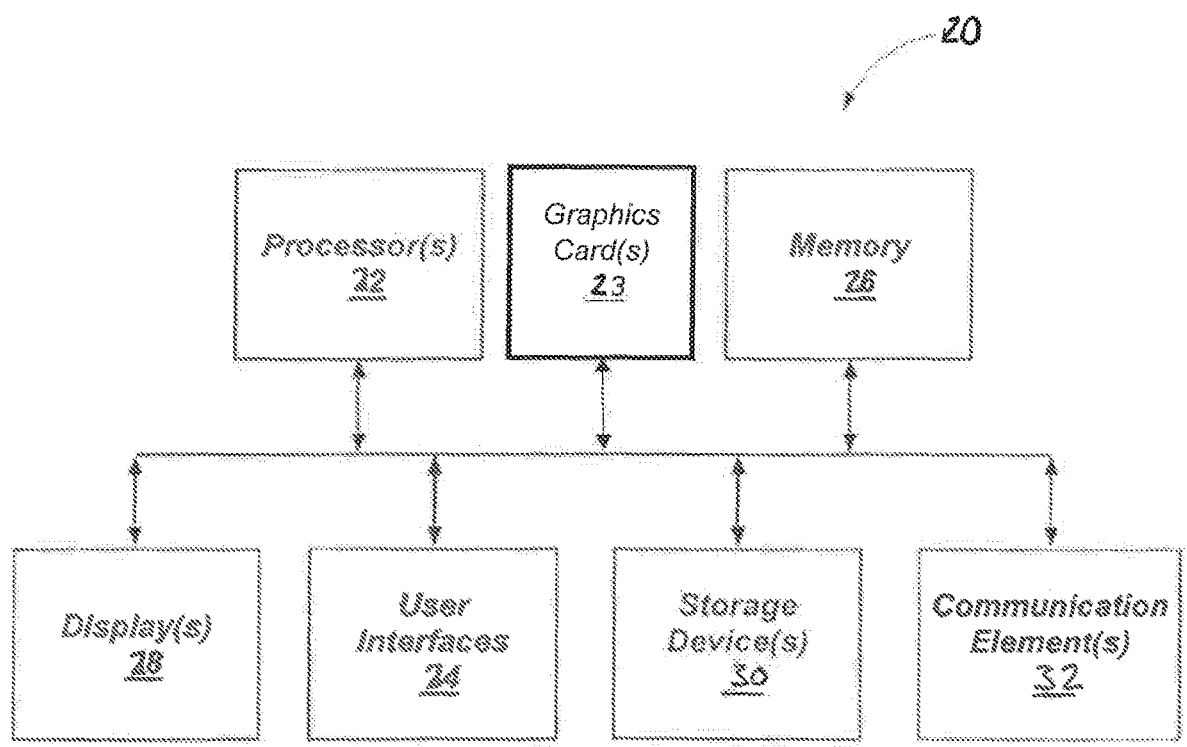
FIG. 7 is a simplified block diagram showing elements of computing devices that may be used in systems and apparatuses, and to implement methods, of this disclosure.

FIG. 7 is a simplified block diagram showing elements of computing devices that may be used in systems and apparatuses, and to implement methods, of this disclosure. A computing system 20 may be a user-type computer, a file server, a computer server, a notebook computer, a tablet, a handheld device, a mobile device, or other similar computer system for executing software. More specifically, the computing system 20 may be employed as the previously described servers 3 and/or remote clients 4, 4'. The computing system 20 may be configured to execute software programs containing computing instructions and may include one or more processors 22, memory 26, one or more displays 28, one or more user interface elements 24, one or more communication elements 32, and one or more storage devices 30 (also referred to herein simply as storage 30).

The processors 22 may be configured to execute a wide variety of operating systems and applications including the computing instructions for transmitting a data flow transiting between a host computer and a remote client using the bandwidth of a computer network of the present disclosure.

The processors 22 may be configured as a general-purpose processor such as a microprocessor, but in the alternative, the general-purpose processor may be any processor, controller, microcontroller, or state machine suitable for carrying out processes of the present disclosure. The processor 22 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The graphics cards 23 may be a dedicated graphic processor with special architecture and instruction to perform graphic operations, or a high performance microprocessor in accordance with the foregoing description for processors 22.

The memory 26 may be used to hold computing instructions, data, and other information for performing a wide variety of tasks including capturing and broadcasting a user computer session in accordance with the present disclosure. By way of example, and not limitation, the memory 26 may include Synchronous Random Access Memory (SRAM), Dynamic RAM (DRAM), Read-Only Memory (ROM), Flash memory, and the like. The terms "memory," "memory device," and "computer readable storage medium," as used herein, shall be construed not to encompass transitory signals.

The display 28 may be a wide variety of displays such as, for example, light-emitting diode displays, liquid crystal displays, cathode ray tubes, and the like. In addition, the display 28 may be configured with a touch-screen feature for accepting user input as a user interface element 24.

As nonlimiting examples, the user interface elements 24 may include elements such as displays, keyboards, push-buttons, mice, joysticks, haptic devices, microphones, speakers, cameras, and touchscreens.

As nonlimiting examples, the communication elements 32 may be configured for communicating with other devices or communication networks. As nonlimiting examples, the communication elements 32 may include elements for communicating on wired and wireless communication media, such as for example, serial ports, parallel ports, Ethernet connections, universal serial bus (USB) connections, IEEE 1394 ("firewire") connections, THUNDERBOLT' connections, BLUETOOTH® wireless networks, ZigBee wireless networks, 802.11 type wireless networks, cellular telephone/ data networks, and other suitable communication interfaces and protocols.

The storage 30 may be used for storing relatively large amounts of nonvolatile information for use in the computing system 20 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices. The terms "storage" and "storage device," as used herein, shall be construed not to encompass transitory signals.

A person of ordinary skill in the art will recognize that the computing system 20 may be configured in many different ways with different types of interconnecting buses between the various elements. Moreover, the various elements may be subdivided physically, functionally, or a combination thereof. As one nonlimiting example, the memory 26 may be divided into cache memory, graphics memory, and main memory. Each of these memories may communicate directly or indirectly with the one or more processors 22 on separate buses, partially combined buses, or a common bus.

What is claimed is:

1. A method for transmitting a data flow transiting between a host computer and a remote client using the bandwidth of a computer network, the data including at least:
   display and sound data generated by a user session running on the host computer, and
   control data generated by at least one input-output device of the remote client,
   the method comprising sequencing the data flow into packets of display data, sound data and control data, numbering the packets, and applying a plurality of data flow reliability treatments to prevent transmission failures, with the reliability treatments being applied respectively to the display, sound and control data being different from each other, such that the reliability treatments applicable to the sound and control data provide greater redundancy than the reliability treatments for the display data, and wherein applying the sound data reliability treatment comprises providing external redundancy for the transmission of the packets of sound data and
   wherein applying the control data reliability treatment comprises providing internal redundancy for the transmission of the packets of control data,
   wherein external redundancy comprises duplication of the packets of sound data transmitted from the host computer to the remote client and further comprises the following steps:
       transmitting a first transmission of a first packet of sound data;
       transmitting a second transmission of the first packet of sound data, the second transmission occurring after a first period of time; and
       transmitting a first transmission of a second packet of sound data, with the first transmission of the second packet of sound data occurring after a second period of time;
       wherein the first period of time is less than the second period of time, and the second packet is numbered with an integer directly greater than a number of the first packet; and
   wherein internal redundancy comprises the following steps:
       preparing a first sequence of control data into a first packet of control data;
       transmitting the first packet of control data;
       preparing a second packet of control data comprising newly generated control data and a portion of the first sequence of control data previously transmitted in the first packet of control data; and
       transmitting the second packet of control data, wherein the control data is transmitted at a higher frequency than the sound and display data.

2. The method according to claim 1, wherein applying the display data
reliability treatment comprises:
detecting, by the remote client, of a loss of display data;
after detecting the loss of display data, transmitting, by the remote client to the host computer, a negative acknowledgement information message reporting the loss of display data; and
after the negative acknowledgement information message is received, transmitting the lost display data from the host computer to the remote client.

3. The method according to claim 1, wherein applying the display data reliability treatment comprises:
detecting, by the remote client, a loss of display data;
when a loss of display data is not detected, transmitting, by the remote client to the host computer, an acknowledgement information message reporting the absence of loss of display data; and
when the acknowledgement information message is not received, transmitting the lost display data from the host computer to the remote client.

4. The method according to claim 1, wherein
transmitting the second transmission of the first packet of sound data after the first period of time comprises transmitting the second transmission of the first packet of sound data after between 5 and 20 ms, and transmitting the first transmission of the second packet of sound data after the second period of time comprises transmitting the first transmission of the second packet of sound data after between 10 and 30 ms.

* * * * *